United States Patent
Henning et al.

(10) Patent No.: US 11,466,154 B2
(45) Date of Patent: Oct. 11, 2022

(54) ROOM TEMPERATURE CURABLE ORGANOPOLYSILOXANE COMPOSITION AND ELECTRIC/ELECTRONIC APPARATUS

(71) Applicant: DOW SILICONES CORPORATION, Midland, TX (US)

(72) Inventors: Jody J. Henning, Midland, MI (US); John B. Horstman, Midland, MI (US); Vennesa O. Jansma, Midland, MI (US); Steven Swier, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 159 days.

(21) Appl. No.: 16/982,082

(22) PCT Filed: Mar. 21, 2019

(86) PCT No.: PCT/US2019/023318
§ 371 (c)(1),
(2) Date: Sep. 18, 2020

(87) PCT Pub. No.: WO2019/183318
PCT Pub. Date: Sep. 26, 2019

(65) Prior Publication Data
US 2021/0095125 A1    Apr. 1, 2021

Related U.S. Application Data

(60) Provisional application No. 62/645,886, filed on Mar. 21, 2018.

(51) Int. Cl.
| | | |
|---|---|---|
| C08G 77/18 | (2006.01) |
| C08L 83/04 | (2006.01) |
| C09D 7/63 | (2018.01) |
| C08K 5/5419 | (2006.01) |
| C09D 183/04 | (2006.01) |

(52) U.S. Cl.
CPC .............. *C08L 83/04* (2013.01); *C08G 77/18* (2013.01); *C08K 5/5419* (2013.01); *C09D 7/63* (2018.01); *C09D 183/04* (2013.01); *C08L 2203/206* (2013.01); *C08L 2666/44* (2013.01)

(58) Field of Classification Search
CPC ........ C08G 77/18; C08G 77/16; C09D 183/06
See application file for complete search history.

(56) References Cited

U.S. PATENT DOCUMENTS

| | | |
|---|---|---|
| 8,895,678 B2 | 11/2014 | Yoshitake |
| 8,921,493 B2 | 12/2014 | Horstman et al. |
| 8,921,494 B2 | 12/2014 | Horstman et al. |
| 2009/0286916 A1 | 11/2009 | Iwasaki et al. |
| 2010/0305273 A1 | 12/2010 | Schaefer et al. |
| 2012/0277370 A1 | 11/2012 | Sakamoto et al. |
| 2014/0066570 A1 | 3/2014 | Kodama et al. |
| 2015/0140346 A1 | 5/2015 | Iida |
| 2015/0252220 A1 | 9/2015 | Okawa et al. |
| 2017/0037287 A1* | 2/2017 | Kodama ................. C08L 83/00 |

FOREIGN PATENT DOCUMENTS

| | | |
|---|---|---|
| CN | 1875071 A | 12/2006 |
| WO | 2005044920 A1 | 5/2005 |
| WO | 2015098118 A1 | 7/2015 |

OTHER PUBLICATIONS

International Search Report for PCT/US2019/023318 dated Jul. 4, 2019, 4 pages.

* cited by examiner

*Primary Examiner* — Kuo Liang Peng
(74) *Attorney, Agent, or Firm* — Warner Norcross + Judd LLP

(57) ABSTRACT

A room temperature curable organopolysiloxane composition comprises: (A) an organopolysiloxane having alkoxysilyl-containing groups at both molecular terminals; (B) an organopolysiloxane resin; (C) an alkoxysilane; and (D) a condensation-reaction catalyst. The room temperature curable organopolysiloxane composition exhibits good to excellent storage stability. In addition, the room temperature curable organopolysiloxane composition can form a cured product exhibiting good to excellent mechanical properties.

14 Claims, No Drawings

ROOM TEMPERATURE CURABLE ORGANOPOLYSILOXANE COMPOSITION AND ELECTRIC/ELECTRONIC APPARATUS

CROSS-REFERENCE TO RELATED APPLICATIONS

This application is the National Stage of International Appl. No. PCT/US2019/023318 filed on 21 Mar. 2019, which claims priority to and all advantages of U.S. Provisional Patent Appl. No. 62/645,886 filed on 21 Mar. 2018, the content of which is hereby incorporated by reference.

TECHNICAL FIELD

The present invention relates to a room temperature curable organopolysiloxane composition that can cure at room temperature by contact with moisture in air, and an electric/electronic apparatus obtained by using the composition.

BACKGROUND ART

Room temperature curable organopolysiloxane compositions that form cured products by curing at room temperature by contacting moisture in air are used as sealants, adhesives, or coatings of an electric/electronic apparatus because they do not require heating to cure. Patent Document 1 proposes a room temperature curable organopolysiloxane composition comprising: an organopolysiloxane having on silicon atoms in the molecular chain in one molecule at least two alkoxysilyl-containing groups, an organopolysiloxane having on silicon atom in the molecular chain neither a hydroxyl group nor an alkoxy group, an alkoxysilane or its partial hydrolysis and condensation product, and a condensation-reaction catalyst. Patent Document 2 proposes a room temperature curable organopolysiloxane composition comprising: an organopolysiloxane having in a molecule at least two alkoxysilyl-containing groups on silicon atoms in the molecular chain, a diorganodialkoxysilane or partially hydrolyzed condensate thereof, and a condensation-reaction catalyst. Patent Document 3 proposes a room temperature curable organopolysiloxane composition comprising: an organopolysiloxane consisting of a both ends alkoxysilyl group-terminated polyorganosiloxane and a partial hydrolysis condensate an alkoxysilane compound, an alkoxysilane compound or a partial hydrolysis condensate thereof, and an organic titanium compound.

However, although the room temperature curable organopolysiloxane compositions described in Patent Documents 1 to 3 form cured products with good adhesion to a substrate, they have the problem that the cured products have poor mechanical properties such as breaking stress and elongation.

PRIOR ART DOCUMENTS

Patent Documents

Patent Document 1: United States (U.S.) Patent Application Publication No. 2014/0066570 A1
Patent Document 2: International Publication No. WO2015/098118 A1
Patent Document 3: U.S. Patent Application Publication No. 2015/0140346 A1

BRIEF SUMMARY OF INVENTION

Technical Problem

An object of the present invention is to provide a room temperature curable organopolysiloxane composition which exhibits good to excellent storage stability, and by curing at room temperature by contacting moisture in air, forms a cured product exhibiting good to excellent mechanical properties. Another object of the present invention is to provide an electric/electronic apparatus which exhibits good to excellent reliability.

Solution to Problem

In various embodiments, the room temperature curable organopolysiloxane composition of this disclosure comprises:
(A) about 100 parts by mass of an organopolysiloxane represented by the following general formula:

$$X-(SiR^1_2O)_m-SiR^1_2-X;$$

wherein each $R^1$ is the same or different monovalent hydrocarbon group lacking an aliphatic unsaturated bond, each X is an alkoxysilyl-containing group selected from the group consisting of a group represented by the following general formula:

$$-R^3-SiR^1_a(OR^2)_{(3-a)};$$

a group represented by the following general formula:

$$-R^3-(SiR^1_2O)_n-SiR^1_2-R^3-SiR^1_a(OR^2)_{(3-a)};$$

and a group represented by the following general formula:

$$-R^3-(SiR^1_2O)_n-SiR^1_b-[OSiR^1_2-R^3-SiR^1_a(OR^2)_{(3-a)}]_{(3-b)};$$

wherein each $R^1$ is as described above, $R^2$ is an alkyl group, each $R^3$ is the same or different alkylene group, "a" is 0, 1, or 2, "b" is 0 or 1, "n" is an integer of from 1 to 20, and "m" is an integer of from 50 to 1000;
(B) about 50 to about 200 parts by mass of an organopolysiloxane resin having a content of OZ in a range of from about 30 mol % to about 54 mol %, wherein each Z is H or an alkyl group such that OZ represents a silanol group and/or a silicon atom-bonded alkoxy group (e.g. a silicon atom-bonded methoxy group), and represented by the following average unit formula:

$$(R^4_3SiO_{1/2})_c(R^4_2SiO_{2/2})_d(R^4SiO_{3/2})_e;$$

wherein each $R^4$ is the same or different monovalent hydrocarbon group, and "c", "d", and "e" are numbers satisfied by the following conditions: $0 \leq c < 0.1$, $0.3 \leq d \leq 0.6$, $0.4 \leq e \leq 0.7$, and $c+d+e=1$;
(C) about 0.5 to about 20 parts by mass of an alkoxysilane represented by the following general formula:

$$R^5_xSi(OR^6)_{(4-x)};$$

wherein $R^5$ is a monovalent hydrocarbon group, $R^6$ is an alkyl group, and "x" is an integer of from 0 to 2; and
(D) about 0.1 to about 20 parts by mass of a condensation-reaction catalyst.

In various embodiments, the alkoxysilyl-containing group in component (A) is a group represented by the following formula:

$$-C_2H_4-Si(CH_3)_2O-Si(CH_3)_2-C_2H_4-Si(OCH_3)_3.$$

In various embodiments, component (B) comprises an organopolysiloxane resin represented by the following average unit formula:

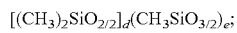

wherein "c", "d", and "e" are numbers satisfied by the following conditions: 0.3≤d≤0.6, 0.4≤e≤0.7, and d+e=1.

In various embodiments, component (C) comprises dimethyldimethoxysilane and/or methyltrimethoxysilane.

The room temperature curable organopolysiloxane composition of this disclosure can be used for various applications. In certain embodiments, the room temperature curable organopolysiloxane composition is used as a conformal coating agent, e.g. as a conformal coating agent for an electric/electronic apparatus. Thus, in various embodiments, the electric/electronic apparatus of this disclosure can be obtained by using the room temperature curable organopolysiloxane composition.

Effects of Invention

The room temperature curable organopolysiloxane composition according to this disclosure generally exhibits good to excellent storage stability. In addition, by curing the room temperature curable organopolysiloxane composition at room temperature by contacting moisture in air, the room temperature curable organopolysiloxane composition can form a cured product exhibiting good to excellent mechanical properties, such as a breaking stress and/or elongation.

Additionally, the electric/electronic apparatus according to this disclosure generally has good to excellent reliability due to high hardness and/or good to excellent thermal shock stability properties of the cured product of the room temperature curable organopolysiloxane composition.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5%, of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Room Temperature Curable Organopolysiloxane Composition>

In various embodiments, the room temperature curable organopolysiloxane composition according to this disclosure (hereinafter, the "composition") comprises the above components (A) to (D). In further embodiments, the composition consists essentially of, optionally consists of, the above components (A) to (D). In other embodiments, the composition further comprises one or more optional additives. Without being bound or limited by any particular theory, it is thought that the composition exhibits good to excellent storage stability. In addition, by curing the composition at room temperature by contacting moisture in air, the composition can form a cured product exhibiting good to excellent mechanical properties, such as a breaking stress and/or elongation.

In various embodiments, component (A) comprises, or is, an organopolysiloxane represented by the following general formula:

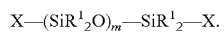

In the formula, each $R^1$ is the same or different monovalent hydrocarbon group lacking an aliphatic unsaturated bond. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, each $R^1$ is an alkyl group, a cycloalkyl group, or an aryl group. In further embodiments, each $R^1$ is a methyl group or phenyl group.

In the formula, "m" means a degree of polymerization ("DP"). In various embodiments, "m" is an integer from 50 to 1000, optionally an integer from 50 to 500, or optionally an integer from 50 to 300. It is thought that when "m" is greater than or equal to the lower limit of the range described above, elastic property of the cured product is improved, and when "m" is less than or equal to the upper limit of the range described above, miscibility, handling and processability of the resulting composition are improved.

In the formula, each X is an alkoxysilyl-containing group. In various embodiments, X is selected from the group consisting of:
a group represented by the following general formula;

$$-R^3-SiR^1_a(OR^2)_{(3-a)},$$

a group represented by the following general formula;

$$-R^3-(SiR^1_2O)_n-SiR^1_2-R^3-SiR^1_a(OR^2)_{(3-a)},$$

and a group represented by the following general formula;

$$-R^3-(SiR^1_2O)_n-SiR^1_b-[OSiR^1_2-R^3-SiR^1_a(OR^2)_{(3-a)}]_{(3-b)}.$$

In the formulae, each $R^1$ is as described above. In the formulae, $R^2$ is an alkyl group. Examples of such groups include, but are not limited to, a methyl group, an ethyl group, a propyl group, a butyl group, a pentyl group, a hexyl group, a heptyl group, an octyl group, a nonyl group, a decyl group, and an octadecyl group. In certain embodiments, $R^2$ is a methyl group or an ethyl group.

In the formulae, each $R^3$ is the same or different alkylene group. Examples of such groups include, but are not limited to, a methylmethylene group, an ethylene group, a methylethylene group, a propylene group, a butylene group, a pentylene group, a hexylene group, a heptylene group, and an octylene group. In certain embodiments, each $R^3$ is a methylmethylene group, an ethylene group, a methylethylene group, or a propylene group.

In the formulae, "a" is 0, 1, or 2, or optionally is 0 or 1. In the formulae, "b" is 0 or 1, or optionally is 0. In the formulae, "n" is an integer of from 1 to 20, optionally an integer of from 1 to 10, or optionally an integer of from 1 to 5.

Examples of suitable alkoxysilyl-containing groups include groups represented by the following formulae:

—$C_2H_4$—Si(OCH$_3$)$_3$

—$C_2H_4$—SiCH$_3$(OCH$_3$)$_2$

—$C_3H_6$—Si(OCH$_3$)$_3$

—$C_2H_4$—Si(OC$_2$H$_5$)$_3$

—$C_2H_4$—Si(CH$_3$)$_2$O—Si(CH$_3$)$_2$—$C_2H_4$—Si(OCH$_3$)$_3$

—$C_3H_6$—Si(CH$_3$)$_2$O—Si(CH$_3$)$_2$—$C_2H_4$—Si(OCH$_3$)$_3$

—$C_2H_4$—Si(CH$_3$)$_2$O—Si(CH$_3$)$_2$—$C_2H_4$—SiCH$_3$(OCH$_3$)$_2$

—$C_2H_4$—Si(CH$_3$)$_2$O—Si(CH$_3$)$_2$—$C_3H_6$—Si(OCH$_3$)$_3$

—$C_3H_6$—Si(CH$_3$)$_2$O—Si(CH$_3$)$_2$—$C_3H_6$—Si(OCH$_3$)$_3$

—$C_2H_4$—Si(CH$_3$)$_2$O—Si(CH$_3$)$_2$—$C_6H_{12}$—Si(OCH$_3$)$_3$

—$C_2H_4$—[Si(CH$_3$)$_2$O]$_2$—Si(CH$_3$)$_2$—$C_2H_4$—Si(OCH$_3$)$_3$

—$C_2H_4$—Si(CH$_3$)$_2$O—Si(CH$_3$)$_2$—$C_2H_4$—Si(OC$_2$H$_5$)$_3$

—$C_2H_4$—Si(CH$_3$)$_2$OSiC$_3$H$_7$[OSi(CH$_3$)$_2$—$C_2H_4$—Si(OCH$_3$)$_3$]$_2$

—$C_2H_4$—Si(CH$_3$)$_2$OSiCH$_3$[OSi(CH$_3$)$_2$—$C_2H_4$—Si(OCH$_3$)$_3$]$_2$

—$C_2H_4$—Si(CH$_3$)$_2$OSiC$_3$H$_7$[OSi(CH$_3$)$_2$—$C_2H_4$—SiCH$_3$(OCH$_3$)$_2$]$_2$

The viscosity at 23±2° C. of component (A) is not limited. In various embodiments, the viscosity of component (A) at 23±2° C. is in a range of from about 100 to about 10,000 mPa·s, or optionally in a range of from about 100 to about 1,000 mPa·s. It is thought that when the viscosity of component (A) is greater than or equal to the minimum value of the range given above, elastic property of the cured product is improved, and when it is less than or equal to the maximum value of the range given above, miscibility, handling and processability of the resulting composition are improved.

In various embodiments, component (B) comprises, or is, an organopolysiloxane resin represented by the following average unit formula:

$$(R^4_3SiO_{1/2})_c(R^4_2SiO_{2/2})_d(R^4SiO_{3/2})_e.$$

In the formula, each $R^4$ is the same or different monovalent hydrocarbon group. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, each $R^4$ is an alkyl group, a cycloalkyl group, or an aryl group. In further embodiments, each $R^4$ is a methyl group or phenyl group.

In the formula, "c", "d", and "e" are numbers satisfied by the following conditions: $0 \leq c < 0.1$, $0.3 \leq d \leq 0.6$, $0.4 \leq e \leq 0.7$, and $c+d+e=1$; or optionally $c=0$, $0.3 \leq d \leq 0.6$, $0.4 \leq e \leq 0.7$, and $c+d+e=1$. It is thought that when "d" is greater than or equal to the lower limit of the range described above, the composition forms a cured product exhibiting good flexibility, and when "b" is less than or equal to the upper limit of the range described above, the composition forms a cure product exhibiting good mechanical strength.

In certain embodiments, component (B) comprises an organopolysiloxane resin represented by the following average unit formula:

$$[(CH_3)_2SiO_{2/2}]_d(CH_3SiO_{3/2})_e.$$

In the formula, "d" and "e" are numbers as described above.

In various embodiments, component (B) has a content of OZ in a range of from about 30 mol % to about 54 mol %, optionally in a range of from about 30 mol % to about 53 mol %, optionally in a range of from about 30 mol % to about 52 mol %, optionally in a range of from about 30 mol % to about 51 mol %, optionally in a range of from about 35 mol % to about 54 mol %, optionally in a range of from about 35 mol % to about 53 mol %, optionally in a range of from about 35 mol % to about 52 mol %, or optionally in a range of from about 35 mol % to about 51 mol %. It is thought that when the content of OZ is in the range(s) given above, compatibility of component (B) in component (A) is improved. Wherein each Z is H or an alkyl group such that OZ represents a silanol group and/or a silicon atom-bonded alkoxyl group. In certain embodiments, each Z is H or a methyl group such that OZ represents a silanol group and/or a silicon atom-bonded methoxy group. In various embodiments, the OZ content comprises silanol groups, silicon atom-bonded alkoxyl group, or a combination of silanol groups and silicon atom-bonded alkoxyl groups.

An example of a test method for determining OZ content is as follows. In the test method for obtaining the mol % of OZ, it is analyzed by $^{29}$Si and $^{13}$C NMR in deuterated benzene. Total OZ content is determined from $^{29}$Si NMR analysis and is reported as a molar fraction based on Si units. In certain embodiments, the amount of this OZ content that was methoxy is determined from $^{13}$C NMR analysis (1,4-dioxane is used as an internal standard). The difference between the total OZ content and the amount of methoxy was the amount of silanol groups present.

Component (B) generally has a molecular weight distribution and is a mixture of a plurality of organopolysiloxane resins. In addition, component (B) may be obtained by blending individually prepared organopolysiloxane resins. In such cases, each organopolysiloxane resin need not correspond to the average unit formula specified above, and the mixture thereof may satisfy the above-mentioned average unit formula.

In various embodiments, the content of component (B) is in a range of from about 50 to about 200 parts by mass, optionally in a range of from about 80 to about 200 parts by mass, or optionally in a range of from about 100 to about 200 parts by mass, relative to 100 parts by mass of component (A). It is thought that when the content of component (B) is greater than or equal to the lower limit of the range described above, the thermal shock stability of the resulting cured product is improved, and when the content is less than or equal to the upper limit of the range described above, hardness is improved with good thermal shock stability.

In various embodiments, component (C) comprises, or is, an alkoxysilane represented by the general formula:

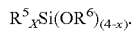

$$R^5_x Si(OR^6)_{(4-x)}.$$

In the formula, $R^5$ is a monovalent hydrocarbon group. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; alkenyl groups such as a vinyl group, an allyl group, a butenyl groups, a pentenyl groups, a hexenyl group, a heptenyl group, an octenyl group, a nonenyl group, a decenyl group, and an octadecenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, $R^5$ is an alkyl group or alkenyl group. In further embodiments, $R^5$ is a methyl group or vinyl group.

In the formula, $R^6$ is an alkyl group. Examples of such groups include the alkyl groups described above for $R^5$. In certain embodiments, $R^6$ is a methyl group or an ethyl group.

In the formula, "x" is an integer of from 0 to 2, or optionally is 1 or 2.

Examples of component (C) include, but are not limited to, dimethyldimethoxysilane, methyltrimethoxysilane, methylphenyldimethoxysilane, and dimethyldiethoxysilane. Component (C) may be one of these alkoxysilanes or a combination of two or more used as a mixture. In certain embodiments, component (C) comprises, or is, dimethyldimethoxysilane and/or methyltrimethoxysilane.

In various embodiments, the content of component (C) is in a range of from about 0.5 to about 20 parts by mass, optionally in a range of from about 1 to about 20 parts by mass, optionally in a range of from about 1 to about 15 parts by mass, or optionally in a range of from about 0.5 to about 10 parts by mass, relative to 100 parts by mass of component (A). It is thought that when the content of component (C) is greater than or equal to the lower limit of the range described above, the resulting composition cures rapidly by moisture in air, and when the content is less than or equal to the upper limit of the range described above, the curability of the resulting composition is sufficient and the shelf life of the resulting composition under moisture blocking is improved.

Component (D) is a condensation-reaction catalyst. Examples of component (D) include, but are not limited to: tin compounds such as dimethyltin dineodecanoate, stannous octoate, and the like; and titanium compounds such as tetra(isopropoxy)titanium, tetra(n-butoxy)titanium, tetra(t-butoxy)titanium, di(isopropoxy)bis(ethylacetoacetate)titanium, di(isopropoxy)bis(methylacetoacetate)titanium, di(isopropoxy)bis(acetylacetonate)titanium, and the like.

In various embodiments, the content of component (D) is in a range of from about 0.1 to about 20 parts by mass, optionally in a range of from about 0.1 to about 15 parts by mass, or optionally in a range of from about 1 to about 15 parts by mass, relative to 100 parts by mass of component (A). It is thought that when the content of component (D) is greater than or equal to the lower limit of the range described above, the resulting composition cures sufficiently by moisture in air, and when the content is less than or equal to the upper limit of the range described above, surface cure rate of the resulting composition is improved.

As introduced above, the composition according to this disclosure may further comprise components in addition to and other than components (A) to (D). For example, the composition may further comprise at least one of a chelating agent, an adhesion promoter, or the like.

In various embodiments, the composition further comprises a chelating agent for component (D). Examples of the chelating agent include alpha-substituted aceto-acetic esters such as methylacetoacetate, ethylacetoacetate, or the like.

The content of the chelating agent is not limited provided that it is an amount that can impart sufficient stability of component (D). In various embodiments, the content of the chelating agent is in a range of from about 0.01 to about 20 parts by mass, or optionally in a range of from about 0.01 to about 15 parts by mass, relative to 100 parts by mass of component (A).

In various embodiments, the composition further comprises an adhesion promoter. Examples of the adhesion promoter include, but are not limited to: epoxy group-containing alkoxysilanes such as 3-glycidoxytrimethoxysilane, 3-glycidoxypropyltriethoxysilane, 3-glycidoxypropylmethoxysilane, 2-(3,4-epoxycyclohexyl)ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes. In certain embodiments, the adhesion promoter comprises, or is, selected from reaction mixtures of the above epoxy group-containing alkoxysilanes and the above amino group-containing alkoxysilanes.

The content of the adhesion promoter is not limited provided that it is an amount that can impart sufficient adhesion to the organic resin that the composition contacts during curing. In various embodiments, the content of the adhesion promoter is in a range of from about 0.01 to about 10 parts by mass, or optionally in a range of from about 0.01 to about 5 parts by mass, relative to 100 parts by mass of component (A).

<Electric/Electronic Apparatus>

In various embodiments, the electric/electronic apparatus according to this disclosure is obtained by using the room temperature curable organopolysiloxane composition described above. The electric/electronic apparatus is not particularly limited, but is exemplified by electric/electronic apparatuses that contain electrical circuits, electrodes, or the like. It is thought that such electric/electronic apparatuses have good to excellent reliability due to good to excellent adhesion to the substrate contacted during curing of the cured product, and/or good to excellent thermal shock stability.

EXAMPLES

The following examples, illustrating the room temperature curable organopolysiloxane composition and the cured product, are intended to illustrate and not limit the present invention. The room temperature curable organopolysiloxane composition will now be described using Practical Examples.

<Preparation of Organopolysiloxanes>

A 3-neck round bottom flask was loaded with vinyl terminated polydimethylsiloxane. A Teflon™ stir paddle was used for mixing and a nitrogen blanket was applied. The polymer was then heated to 40° C. and a platinum catalyst (platinum tetramethyldivinyldisiloxane complex in tetramethyldivinyldisiloxane) was added at a concentration of 5 ppm platinum. A methoxy/SiH functional silane made internally at Dow Corning was added to fully react with all vinyl groups including a slight excess. The reaction was allowed to be heated at 40° C. for 1 hour. Vinyltrimethoxysilane was then added to react with residual SiH and the heating process continued at 40° C. for 1 more hour. The final product was used as synthesized without further modifications.

The organopolysiloxanes in Table 1 below represented by the general formula below were used as component (A):

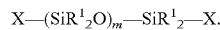

TABLE 1

| (A) | $R^1$ | m | X |
|---|---|---|---|
| (1A) | $CH_3$ | 56 | $-C_2H_4-Si(CH_3)_2OSi(CH_3)_2-C_2H_4-Si(OCH_3)_3$ |
| (2A) | $CH_3$ | 124 | $-C_2H_4-Si(CH_3)_2OSi(CH_3)_2-C_2H_4-Si(OCH_3)_3$ |
| (3A) | $CH_3$ | 172 | $-C_2H_4-Si(CH_3)_2OSi(CH_3)_2-C_2H_4-Si(OCH_3)_3$ |
| (4A) | $CH_3$ | 172 | $-CH_2CH_2-Si(CH_3)_2OSi(CH_3)_2-C_2H_4-Si(OCH_3)_3$ |
| (5A) | $CH_3$ | 333 | $-C_2H_4-Si(CH_3)_2OSi(CH_3)_2-C_2H_4-Si(OCH_3)_3$ |
| (6A) | $CH_3$ | 800 | $-C_2H_4-Si(CH_3)_2OSi(CH_3)_2-C_2H_4-Si(OCH_3)_3$ |
| (7A) | $CH_3$ | 172 | $-CH_2CH_2-Si(CH_3)_2OSiC_3H_7[OSi(CH_3)_2-C_2H_4-Si(OCH_3)_3]_2$ |
| (8A) | $CH_3$ | 333 | $-CH_2CH_2-Si(CH_3)_2OSiC_3H_7[OSi(CH_3)_2-C_2H_4-Si(OCH_3)_3]_2$ |

<Preparation of Organopolysiloxane Resins>

A 4-neck round bottom flask was loaded with methyltrimethoxysilane and dimethyldimethoxysilane. A Teflon™ stir paddle was using for mixing and a nitrogen blanket was applied. Trifluoromethanesulfonic acid was then added at a concentration of 500 ppm (based on the silanes). Deionized water was also added starting at room temperature and the amount added was based on the desired product methoxy content. The mixture was allowed to heat at reflux for 3 hours then was allowed to cool to 50° C., calcium carbonate was added to neutralize the acid, and the reaction was allowed to mix for several hours. Methanol was removed by a distillation process at atmospheric pressure (up to 115° C.) and then under vacuum at about 1 mmHg and 110° C. oil bath temperature. Finally, the product was filtered at room temperature using a 0.45 um filter then used without further modifications.

The organopolysiloxanes in Table 2 below were used as component (B).

TABLE 2

| (B) | Average unit formula | OZ (mol %) |
|---|---|---|
| (1B) | $[(CH_3)_2SiO_{2/2}]_{0.47}(CH_3SiO_{3/2})_{0.53}$ | 29 |
| (2B) | $[(CH_3)_2SiO_{2/2}]_{0.47}(CH_3SiO_{3/2})_{0.53}$ | 34 |
| (3B) | $[(CH_3)_2SiO_{2/2}]_{0.47}(CH_3SiO_{3/2})_{0.53}$ | 42 |
| (4B) | $[(CH_3)_2SiO_{2/2}]_{0.47}(CH_3SiO_{3/2})_{0.53}$ | 50 |
| (5B) | $[(CH_3)_2SiO_{2/2}]_{0.40}(CH_3SiO_{3/2})_{0.60}$ | 51 |
| (6B) | $[(CH_3)_2SiO_{2/2}]_{0.30}(CH_3SiO_{3/2})_{0.70}$ | 55 |

<Practical Examples and Comparative Examples>

Room temperature curable organopolysiloxane compositions were prepared by uniformly mixing: 5.528 g of component (A), 7.937 g of component (B), 0.470 g of dimethyl dimethoxysilane, 0.630 g of tetra(t-butoxy)titanium, and 0.437 g of methylacetoacetate under moisture blocking. The properties of the compositions and the cured product obtained by curing the compositions were evaluated.

<Appearance of the Room Temperature Curable Organopolysiloxane Composition>

After mixing components to produce the room temperature curable organopolysiloxane compositions, appearance during storage were observed by visual. These results are shown in Table 3 below.

TABLE 3

| Appearance | | Component (B) | | | | | |
|---|---|---|---|---|---|---|---|
| | | (1B) | (2B) | (3B) | (4B) | (5B) | (6B) |
| Component (A) | (1A) | Clear | Clear | Clear | Clear | Clear | Clear |
| | (2A) | Clear | Clear | Clear | Clear | Cloudy | Cloudy |
| | (3A) | Phase separated | Cloudy | Cloudy | Cloudy | Cloudy | Phase separated |
| | (4A) | Phase separated | Clear | Clear | Clear | Cloudy | Phase separated |
| | (5A) | Phase separated | Cloudy | Cloudy | Cloudy | Cloudy | Phase separated |
| | (6A) | Phase separated | Phase separated | Clear | Clear | Clear | Phase separated |

According to the results in Table 3 above, it was found that the room temperature curable organopolysiloxane compositions prepared in the Practical Examples exhibited excellent compatibility of the organopolysiloxanes for component (A) and the organopolysiloxane resins for component (B). In addition, it was found that when the DP of organopolysiloxane for component (A) was increased, the content of OZ in the organopolysiloxane resins for component (B) was generally at least about 35 mol %, but generally not more than about 54 mol %.

<Breaking Stress and Elongation of the Cured Product>

Cured products with 2 mm thickness were obtained by curing the room temperature curable organopolysiloxane compositions for 7 days at 23±2° C., 50±5% relative humidity ("RH"). Then, tensile strength (breaking stress) and elongation (at break) were measured in accordance with ASTM D412-98a using the cured products. These properties of the cured products are shown in Tables 4 and 5 below.

TABLE 4

| Stress at break (MPa) | | Component (B) | | | | | |
|---|---|---|---|---|---|---|---|
| | | (1B) | (2B) | (3B) | (4B) | (5B) | (6B) |
| Component (A) | (1A) | 1.23 | 1.66 | 2.06 | 1.62 | 2.66 | 5.53 |
| | (2A) | — | 2.83 | 2.99 | 2.64 | 4.61 | 9.34 |
| | (3A) | — | 5.74 | 4.82 | 4.34 | 6.44 | — |
| | (4A) | — | 3.33 | 3.14 | 2.89 | 6.41 | — |
| | (5A) | — | 6.23 | 5.50 | 4.59 | 5.81 | — |
| | (6A) | — | — | 4.09 | 4.17 | 4.51 | — |

TABLE 5

| Elongation (%) | | Component (B) | | | | | |
|---|---|---|---|---|---|---|---|
| | | (1B) | (2B) | (3B) | (4B) | (5B) | (6B) |
| Component (A) | (1A) | 22.43 | 22.91 | 26.47 | 18.83 | 11.98 | 5.69 |
| | (2A) | | 42.37 | 36.06 | 28.67 | 25.49 | 44.68 |
| | (3A) | — | 69.28 | 55.19 | 48.09 | 49.53 | — |
| | (4A) | — | 53.17 | 42.71 | 33.58 | 43.54 | — |
| | (5A) | — | 121.47 | 114.80 | 99.70 | 93.27 | — |
| | (6A) | — | — | 153.99 | 146.60 | 124.47 | — |

According to the results in Tables 4 and 5 above, it was found that the cured products of the room temperature curable organopolysiloxane compositions prepared in the Practical Examples exhibited excellent mechanical properties, especially when the DP in the organopolysiloxanes for component (A) was increased and the content of OZ in the organopolysiloxane resins for component (B) was decreased.

<Further Practical Example and Comparative Example>

Room temperature curable organopolysiloxane compositions were prepared by uniformly mixing: 5.528 g of component (A), 7.937 g of component (B), 0.470 g of dimethyl dimethoxysilane, 0.630 g of tetra(t-butoxy)titanium, and 0.437 g of methylacetoacetate under moisture blocking. The properties of the compositions and the cured products obtained by curing the compositions were evaluated.

<Appearance of the Room Temperature Curable Organopolysiloxane Composition>

After mixing components to produce the room temperature curable organopolysiloxane compositions, appearance during storage were observed by visual. These results are shown in Table 6 below.

TABLE 6

| Appearance | | (1B) | (2B) | (3B) | Component (B) (4B) | (5B) | (6B) |
|---|---|---|---|---|---|---|---|
| Component (A) | (7A) | Clear | Clear | Clear | Clear | Cloudy | Cloudy |
|  | (8A) | Phase separated | Clear Cloudy | Clear Cloudy | Clear Cloudy | Cloudy Cloudy | Cloudy Phase separated |

According to the results in Table 6 above, it was found that the room temperature curable organopolysiloxane compositions prepared in the Practical Examples exhibited excellent compatibility of the organopolysiloxane for component (A) and the organopolysiloxane resins for component (B).

<Breaking Stress and Elongation of the Cured Product>

Cured products with 2 mm thickness were obtained by curing the room temperature curable organopolysiloxane compositions for 7 days at 23±2° C., 50±5% RH. Then, tensile strength (breaking stress) and elongation (at break) were measured in accordance with ASTM D412-98a using the cured products. These properties of the cured products are shown in Tables 7 and 8 below.

TABLE 7

| Stress at break (MPa) | | (1B) | (2B) | (3B) | Component (B) (4B) | (5B) | (6B) |
|---|---|---|---|---|---|---|---|
| Component (A) | (7A) | 5.98 | 2.62 | 2.99 | 2.94 | 4.73 | 10.24 |
|  | (8A) | — | 7.63 | 6.44 | 5.31 | 7.14 | — |

TABLE 8

| Elongation (%) | | (1B) | (2B) | (3B) | Component (B) (4B) | (5B) | (6B) |
|---|---|---|---|---|---|---|---|
| Component (A) | (7A) | 82.27 | 37.96 | 33.95 | 30.24 | 25.17 | 48.60 |
|  | (8A) | — | 105.44 | 79.22 | 58.45 | 73.72 | — |

According to the results in Tables 7 and 8 above, it was found that the cured products of the room temperature curable organopolysiloxane compositions prepared in the Practical Examples exhibited excellent mechanical properties, especially when the DP in the organopolysiloxanes for component (A) was increased and the content of OZ in the organopolysiloxane resins for component (B) was decreased.

INDUSTRIAL APPLICABILITY

The room temperature curable organopolysiloxane composition of this disclosure is advantageously used as a conformal coating of an electric/electronic apparatus, because it cures at room temperature by contact with moisture in air and forms a cured product that exhibits good to excellent adhesion to the substrate contacted during curing, and good to excellent mechanical properties such as a breaking stress and/or elongation.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A room temperature curable organopolysiloxane composition comprising:

(A) about 100 parts by mass of an organopolysiloxane represented by the following general formula:

$$X-(SiR^1_2O)_m-SiR^1_2-X;$$

wherein each $R^1$ is the same or different monovalent hydrocarbon group lacking an aliphatic unsaturated bond, each X is an alkoxysilyl-containing group selected from the group consisting of a group represented by the following general formula:

$$-R^3-SiR^1_a(OR^2)_{(3-a)},$$

a group represented by the following general formula;

$$-R^3-(SiR^1_2O)_n-SiR^1_2-R^3-SiR^1_a(OR^2)_{(3-a)},$$

and a group represented by the following general formula;

$$-R^3-(SiR^1_2O)_n-SiR^1_b-[OSiR^1_2-R^3-SiR^1_a(OR^2)_{(3-a)}]_{(3-b)};$$

wherein each $R^1$ is as described above, $R^2$ is an alkyl group, each $R^3$ is the same or different alkylene group, "a" is 0, 1 or 2, "b" is 0 or 1, "n" is an integer of from 1 to 20, and "m" is an integer of from 50 to 1000;

(B) about 50 to about 200 parts by mass of an organopolysiloxane resin represented by the following average unit formula:

$$(R^4_3SiO_{1/2})_c(R^4_2SiO_{2/2})_d(R^4SiO_{3/2})_e(ZO_{1/2})_f;$$

wherein each $R^4$ is the same or different monovalent hydrocarbon group, each Z is H or an alkyl group, and "c", "d" and "e" are numbers satisfied by the following conditions: $0 \leq c < 0.1$, $0.3 \leq d \leq 0.6$, $0.4 \leq e \leq 0.7$, and $c+d+e=1$, and wherein "f" is a number satisfying that the organopolysiloxane resin contains OZ in a range of from about 30 mol % to about 54 mol % based on Si units;

(C) about 0.5 to about 20 parts by mass of an alkoxysilane represented by the following general formula:

$$R^5_xSi(OR^6)_{(4-x)};$$

wherein $R^5$ is a monovalent hydrocarbon group, $R^6$ is an alkyl group, and "x" is an integer of from 0 to 2; and (D) about 0.1 to about 20 parts by mass of a condensation-reaction catalyst.

2. The room temperature curable organopolysiloxane composition according to claim 1, wherein the alkoxysilyl-containing group in component (A) is a group represented by the following formula:

$$-C_2H_4-Si(CH_3)_2O-Si(CH_3)_2-C_2H_4-Si(OCH_3)_3.$$

3. The room temperature curable organopolysiloxane composition according to claim 2, wherein component (B)

comprises an organopolysiloxane resin represented by the following average unit formula:

wherein: "d" and "e" are numbers satisfied by the following conditions: $0.3 \le d \le 0.6$, $0.4 \le e \le 0.7$, and $d+e=1$; each Z is H or an alkyl group; and "f" is a number satisfying that the organopolysiloxane resin contains OZ in a range of from about 30 mol % to about 54 mol % based on Si units.

4. The room temperature curable organopolysiloxane composition according to claim 3, wherein component (C) comprises dimethyldimethoxysilane and/or methyltrimethoxysilane.

5. The room temperature curable organopolysiloxane composition according to claim 1, wherein component (B) comprises an organopolysiloxane resin represented by the following average unit formula:

wherein: "d" and "e" are numbers satisfied by the following conditions: $0.3 \le d \le 0.6$, $0.4 \le e \le 0.7$, and $d+e=1$; each Z is H or an alkyl group; and "f" is a number satisfying that the organopolysiloxane resin contains OZ in a range of from about 30 mol % to about 54 mol % based on Si units.

6. The room temperature curable organopolysiloxane composition according to claim 1, wherein component (C) comprises dimethyldimethoxysilane and/or methyltrimethoxysilane.

7. The room temperature curable organopolysiloxane composition according to claim 1, wherein component (B) contains silanol groups.

8. A conformal coating agent comprising the room temperature curable organopolysiloxane composition according to claim 1.

9. An electric/electronic apparatus obtained by using the room temperature curable organopolysiloxane composition according to claim 1.

10. The room temperature curable organopolysiloxane composition according to claim 1, wherein component (B) contains silicon atom-bonded methoxy groups.

11. The room temperature curable organopolysiloxane composition according to claim 1, wherein the content of component (B) is in a range of from about 80 to about 200 parts by mass, or optionally in a range of from about 100 to about 200 parts by mass, relative to 100 parts by mass of component (A).

12. The room temperature curable organopolysiloxane composition according to claim 1, wherein the content of component (C) is in a range of front about 0.5 to about 15 parts by mass, or optionally in a range of from about 1 to about 10 part(s) by mass, relative to 100 parts by mass of component (A).

13. The room temperature curable organopolysiloxane composition according to claim 1, wherein the content of component (D) is in a range of from about 0.1 to about 15 parts by mass, or optionally in a range of from about 1 to about 15 parts by mass, relative to 100 parts by mass of component (A).

14. The room temperature curable organopolysiloxane composition according to claim 1, wherein component (B) contains silanol groups and silicon atom-bonded methoxy groups.

* * * * *